United States Patent [19]

Brady et al.

[11] 4,153,667
[45] May 8, 1979

[54] METHOD OF FORMING ARTICLES FROM THERMOPLASTIC MATERIALS

[75] Inventors: Thomas E. Brady, Sylvania, Ohio; Nicholas J. Curto, Monroe, Mich.

[73] Assignee: Owens-Illinois, Inc., Toledo, Ohio

[21] Appl. No.: 838,613

[22] Filed: Oct. 3, 1977

Related U.S. Application Data

[63] Continuation of Ser. No. 710,765, Jul. 30, 1976, abandoned.

[51] Int. Cl.² .............................................. B29C 17/07
[52] U.S. Cl. .................................. 264/532; 264/535; 264/289; 264/290 T
[58] Field of Search ........................ 264/89, 94, 95, 96, 264/97, 98, 99, 289, 290 T, 291, 210 R

[56] References Cited

U.S. PATENT DOCUMENTS

| | | | |
|---|---|---|---|
| 2,904,841 | 9/1959 | Haugh | 264/289 |
| 2,928,132 | 3/1960 | Richards, Jr. | 264/289 |
| 3,107,139 | 10/1963 | Cornforth et al. | 264/289 |
| 3,470,282 | 9/1969 | Scalora | 264/97 |
| 3,662,049 | 5/1972 | Gilbert | 264/89 |
| 3,733,309 | 5/1973 | Wyeth et al. | 264/98 X |
| 3,821,349 | 6/1974 | Mozer | 264/99 X |
| 3,903,294 | 9/1975 | Abella | 264/289 |
| 4,039,641 | 8/1977 | Collins | 264/96 X |
| 4,042,657 | 8/1977 | Ostapchenko et al. | 264/89 X |

FOREIGN PATENT DOCUMENTS

| | | | |
|---|---|---|---|
| 683041 | 3/1964 | Canada. | |
| 703608 | 2/1965 | Canada | 264/289 |
| 851874 | 10/1960 | United Kingdom. | |
| 915805 | 1/1963 | United Kingdom. | |
| 930962 | 7/1963 | United Kingdom. | |
| 1083665 | 9/1967 | United Kingdom. | |

Primary Examiner—Jan H. Silbaugh
Attorney, Agent, or Firm—Richard D. Heberling; Myron E. Click; David H. Wilson

[57] ABSTRACT

A method is disclosed for enhancing the yield strength and density of polyethylene terephthalate and other similar thermoplastic materials which are susceptible to strain hardening. In the method, the plastic material is thermally conditioned to a temperature within a range conducive to molecular orientation, and then is mechanically conditioned by stretching in a first direction to a length at least about 2.6 to 2.75 times the original length. Thereafter, the plastic material is stretched in a second direction, with strain hardening and strain-induced crystallization increasing drastically substantially immediately upon the initiation of the second stretching operation due to the mechanical conditioning by elongation during the first stretch. The invention is particularly suitable for forming blow molded containers, where a blowable parison or preform is first stretched along its longitudinal axis to the critical length and is then extensively strain hardened while being blown to the configuration of the container.

9 Claims, 7 Drawing Figures

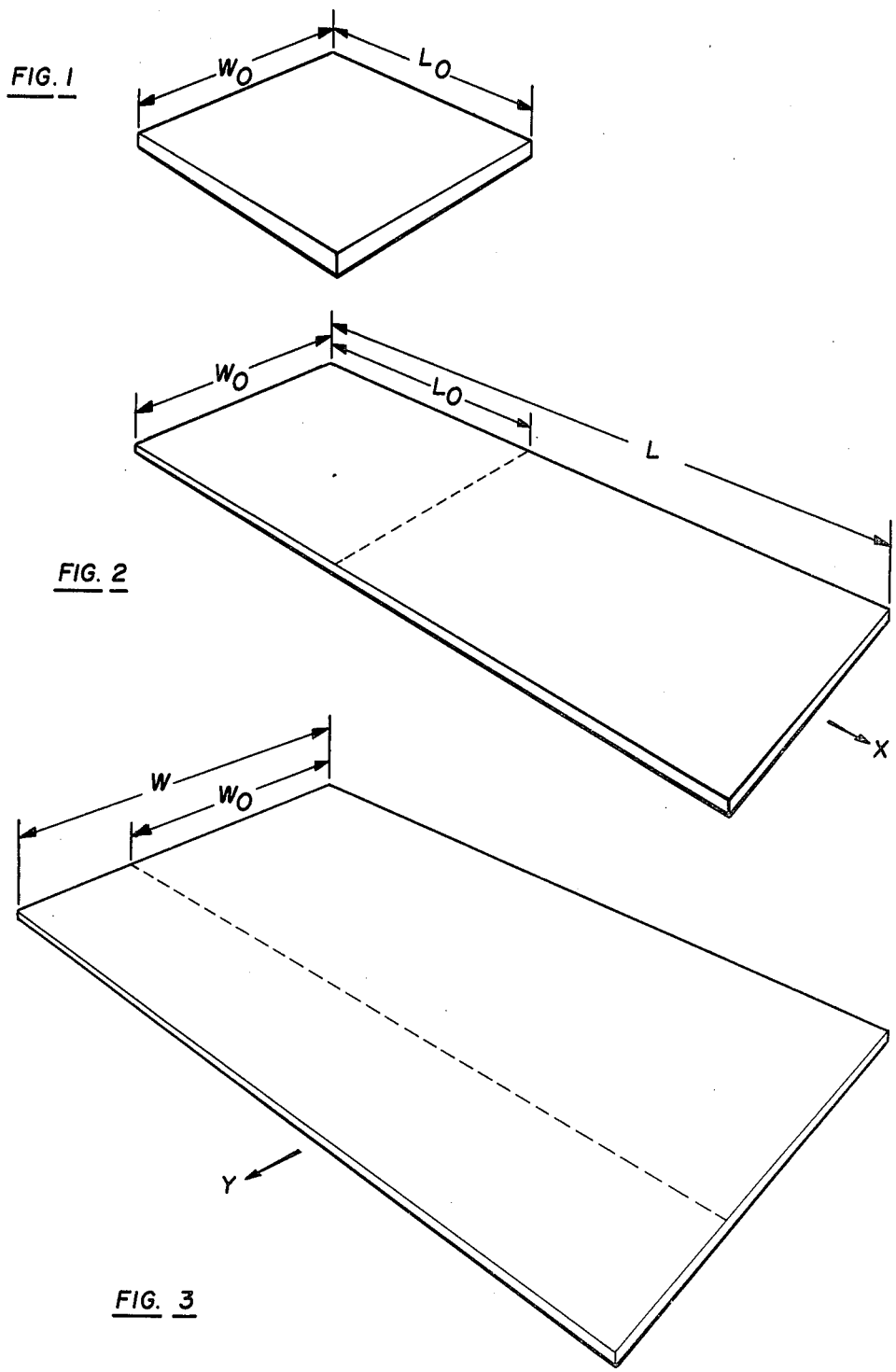

METHOD OF FORMING ARTICLES FROM THERMOPLASTIC MATERIALS

This is a continuation, of application Ser. No. 710,765 filed 7/30/76 now abandoned.

BACKGROUND OF THE INVENTION

1. Field of the Invention

This disclosure relates generally to a method of biaxially orienting thermoplastic materials, and in particular polyethylene terephthalate. In one specific embodiment, a blowable polyethylene terephthalate preform is stretched along its longitudinal axis and then radially expanded to blow air under pressure according to general blow molding techniques.

2. The Prior Art

Various techniques exist in the prior art for both (1) stretching polyethylene terephthalate materials, and (2) blow molding containers of various thermoplastic materials, including polyethylene terephthalate.

For example, U.S. Pat. No. 2,823,421 to Scarlett discloses a method for stretching polyethylene terephthalate film. The method of this patent, however, does not recognize the specific limitations of this invention nor its advantages. In particular, the polyethylene terephthalate film material according to the method of the Scarlett patent is stretched, then reheated, then stretched a second time at a higher temperature, and then heat set at a much higher temperature.

Other methods of treating polyethylene terephthalate material are disclosed in U.S. Pat. Nos. 3,177,277 to Adams and 3,257,489 to Heffelfinger. Again, these patents do not disclose the present invention as will be appreciated more fully from the following detailed description of this invention in comparison to these patent disclosures.

In the specific area of blow molding, U.S. Pat. No. 2,919,462 to Friden is an example of one of the first patents that discloses biaxial orientation of a plastic material, by longitudinally stretching a plastic parison while simultaneously blowing the parison to the configuration of the desired container.

U.S. Pat. No. 3,781,395 to Uhlig discloses and claims a method for sequentially blowing a parison internally of a preform mold, then stretching the blown preform, and then blowing the stretched preform internally of a final blow mold. This patent, however, does not specifically recognize that improved property levels can be achieved in materials that are susceptible to strain-induced crystallization, by effecting a critical major-dimension stretch first and then stretching the material in a second direction to initiate the rapid onset of strain hardening.

Finally, U.S. Pat. No. 3,733,309 to Wyeth discloses a method for blow molding polyethylene terephthalate material, but likewise, fails to recognize and set forth the aspects and advantages of this invention.

In short, the prior art uniformly teaches that property levels are improved by increasing the extent of total stretching or total strain. Accordingly, a problem has heretofore existed in producing extensive strain hardening and strain-induced crystallization at relatively low total areal strains. As used herein, the term "total areal strain" is defined as the quotient obtained by dividing the original surface area into the final surface area of the material after stretching operation.

SUMMARY OF INVENTION

The inventors have discovered that improved property levels in strain hardenable thermoplastic materials are not uniquely dependent upon total area strain. Rather, it has been determined that improved property levels can be achieved in such materials at relatively low total areal strains by effecting a major-dimension stretch first to condition the material by the onset of strain-induced crystallization, and then effecting a second minor-dimension stretch to complete the strain-hardening process. This invention utilizes these discoveries and determinations to provide a novel method of making plastic articles of enhanced properties.

In one aspect of the invention, any plastic material that is susceptible to strain-induced crystallization, is axially stretched in a first direction to a critical length, which in the case of polyethylene terephthalate is at least about 2.6 to 2.75 times the original length in that first direction. This first stretching step serves two basic purposes. First, the molecules of the material are axially oriented in the direction of the first stretch. Second, and more importantly, the material is conditioned by the extent of the stretch in the first direction to enable the rapid onset of intense strain hardening during a subsequent stretching operation in a second direction. After the material is sufficiently stretched in the first direction, it is then stretched in a second direction to strain harden the material, thereby increasing the yield stress and density of the material with substantially less total areal strain.

During the performance of both stretching steps, the plastic material must be at a temperature conducive to molecular orientation— if the material is too hot, the molecules randomly disorient themselves due to thermal activity; if the material is too cold, the stretching operation will be essentially a cold forming process. Additionally, the temperature of the material may preferably be essentially the same during both stretching steps.

The specific minimum extent of stretch in the first direction depends upon the molecular weight (or the inherent viscosity) of the material, the stretch temperature and the stretch rate. For example, polyethylene terephthalate material having a weight average molecular weight of about 36,000 and an inherent viscosity of about .6 requires a minimum stretch in the first direction of about 2.75 for a given temperature and strain rate. On the other hand, polyethylene terephthalate material having a weight average molecular weight of about 65,500 and an inherent viscosity of about 0.9 requires a minimum stretch in the first direction of only about 2.6 for the same given temperature and strain rate.

Another aspect of the invention includes stretching of thermoplastic parison or preform along its longitudinal axis to a length of about 2.6 to 2.75 times its original length, to condition the material and to initiate strain-induced crystallization, so that strain hardening and further strain-induced crystallization will occur upon subsequent radial inflation of the parison within a blow mold cavity. For example, the method in this aspect of the invention includes, first, bringing a tubular parison of polyethylene terephthalate material or a similar material capable of strain-induced crystallization to a temperature within a range where the material is susceptible to molecular orientation. Then, the parison is stretched along its longitudinal axis to a length of about 2.6 to 2.75 times the original axial extent of the parison in order to orient the molecules along the longitudinal axis of the parison, to initiate strain-induced crystallization, and to condition the parison material for the rapid onset of strain-hardening. Thereafter, the parison is blown within a blow mold cavity to the configuration of the final article. Again, because of the extent of the stretch prior to the blow molding step, intense strain hardening will occur substantially immediately after the initiation of the blowing step.

Accordingly, the present invention enables the following advantages not found in the prior art.

First, this invention enables the achievement of various improved property characteristics, such as yield stress and density, for strain-hardenable thermoplastic materials at much lower total areal strains. For example, essentially the same property characteristics can be achieved at areal strains of 6X according to the present invention, that could be achieved in the prior art at areal strains of 9X.

These property level improvements provide numerous advantages. For example, a bottle made according to the present invention, and having the same thickness as a bottle made from similar parison by the techniques of the prior art, will have a greater strength and crystallinity. The crystallinity appears to be quite important in reducing carbon dioxide permeation for containers used to bottle carbonated beverages.

Additionally, for a given set of bottle or container requirements, the present invention permits the use of a thinner bottle. A thinner bottle is more desirable because it (a) requires less material, (b) simplifies parison forming, and (c) reduces the extent of parison reheating prior to blowing.

These and other advantages and meritorious features of the present invention will be more fully appreciated from the following detailed description of the invention, and the appended claims.

BRIEF DESCRIPTION OF THE DRAWINGS

FIGS. 1-3 schematically illustrate a section of strain-hardenable thermoplastic material which is stretched in accordance with the method of the present invention.

More specifically, FIG. 4 illustrates a thermoplastic parison as it is heated to within a temperature range conducive to molecular orientation.

FIG. 5 illustrates the heated parison within a blow mold cavity, as defined by the sections of a blow mold.

FIG. 6 illustrates the step of stretching the parison along its longitudinal axis to condition the thermoplastic material for the rapid onset of strain hardening during the blowing step.

FIG. 7 schematically illustrates the blown bottle within the blow mold cavity.

DETAILED DESCRIPTION OF THE PREFERRED EMBODIMENTS

Figure 4:
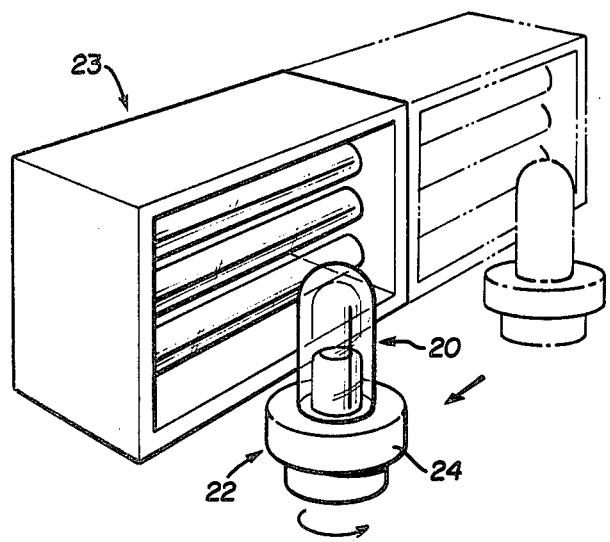
FIGS. 4-7 illustrate the application of the invention to a blow molding operation.

The present invention will now be more particularly described in conjunction with references to the drawings.

Referring first to FIG. 1, a sample of thermoplastic material is shown having a length of $L_0$ and a width $W_0$. For the purposes of the present invention and the advantages following therefrom, the thermoplastic material should preferably be capable of strain hardening and strain-induced crystallization, such as polyethylene terephthalate. Additionally, prior to the performance of the material steps of the present invention, the thermoplastic material must be thermally conditioned to a temperature within a range that is conducive to molecular orientation.

The first step of the invention is illustrated in FIG. 2, where the strain-hardenable thermoplastic material is stretched in the direction X to an extent to increase the dimension $L_0$ to the length L. The ratio of L to $L_0$ has been found to be critical for the advantages of the present invention, for the purpose of enabling the rapid onset of intense strain hardening substantially immediately upon the initiation of the subsequent stretching step. For polyethylene terephthalate the ratio of L to $L_0$ must be at least about 2.6 to 2.75, depending upon the particular molecular weight (or inherent viscosity) of the material, the temperature of the material and the stretch rate. For example, results have shown that polyethylene terephthalate having a weight average molecular weight of about 36,000 and an inherent viscosity (i.v.) of about 0.6 requires a minimum stretching in the first direction to achieve a ratio of $L:L_0$ of about 2.75, under specified stretch temperatures and rates of stretch. For polyethylene terephthalate material having a weight average molecular weight of about 65,000 and an i.v. of about 0.9, it has been determined that the critical extension ratio of $L:L_0$ must be at least about 2.6, under identical stretch rate and temperature. Proportionately, the minimum required extension ratios for polyethylene terephthalate material having a molecular weight and inherent viscosity between these two extremes will be somewhere between about 2.6 and about 2.75.

The critical extension in the first direction of stretch is for three primary purposes. First, the stretching operation aligns the molecules of the material along the axis of the first stretch, in accordance with conventional uniaxial stretch orientation techniques. Second, strain-induced crystallization is initiated. Third, the extent of the stretch in the first direction conditions the material so that intense strain hardening will be initiated substantially immediately after the beginning of a subsequent stretching step in a second direction Y to an extent to increase the width dimension $W_0$ to the width W. This step is shown in FIG. 3. Results show that there is no definable critical stretching requirement in the second direction. This is due to the facts that (a) improved property levels are predominantly dependent upon the "onset" of strain-hardening and (b) the "onset" of strain hardening is achieved in the present invention almost immediately upon the beginning of the second stretching step. Test results have shown, however, that minor improvements in overall property levels are achieved by greater total areal strains; therefore, greater strains in the second direction will yield correspondingly minimal property level improvements. Thus, the ratio $L_0:L$ is critical; and ratio $W_0:W$ is not critical.

Returning now more specifically to each step of the process in order to more fully explain the various aspects of the invention, it was earlier explained that the thermoplastic material must be at a temperature within a range conducive to molecular orientation. The specific temperature for polyethylene terephthalate material depends upon the specific molecular weight (or inherent viscosity), as shown by the following table:

| Minimum Stretch Temperatures for Polyethylene Therephthalate | | | |
|---|---|---|---|
| Weight Av. Molecular Wt. | i.v. | Temperature at Stretch Rate of .025 in. sec.−1 | Temperature at Stretch Rate of .25 in. sec.−1 |
| 65,500 | .9 | 83 degrees C. | All temperatures about 5 degrees C. higher than at stretch rates of .025 3 inch per second. |
| 55,000 | .8 | 81 degrees C. | " |
| 47,500 | .7 | 78.5 degrees C. | " |
| 36,000 | .6 | 75 degrees C. | " |
| 29,000 | .5 | 75 degrees C. | " |

The practical maximum stretch temperature to achieve molecular orientation is about 110 degrees C. for the higher molecular weight samples and less for the lower molecular weight samples.

Two general observations can be made in connection with these ranges of temperatures. First, these temperature ranges have been derived from observations on a particular polyethylene terephthalate resin in a laboratory; therefore, the actual precise temperature and temperature ranges may vary from the ranges shown. Second, better property characteristics are generally achieved when the steps of the present invention are performed at temperatures at the lower end of the specified ranges.

The foregoing disclosure in connection with FIGS. 2 annd 3 point out two critical limitations of the present invention. First, the thermoplastic material must be stretched in a first direction to a length, which for polyethylene terephthalate is at least about 2.6 to 2.75 times the original length; and second, the second stretching step must be conducted subsequent to the first stretching step — in otherwords, the stretching steps must be performed sequentially to achieve the advantages of the present invention. These limitations have been developed through various testing, including the test results which are set out in the following table:

| Response and Properties of A Biaxially Extended Polyethylene Terephthalate | | | | | | | |
|---|---|---|---|---|---|---|---|
| Extension Ratio | | Final Stress of Material During Stretch Extension | | Tensile Testing Yield Stress (PSI) | | Resolved Yield Stress (PSI) | Density (gm/cc) |
| 1st | 2nd | 1st | 2nd | 1st | 2nd | — | — |
| 1 | 1 | — | — | 7936 | 7936 | 11223 | 1.3359 |
| 1.5 | 1.5 | 241 | 293 | 8895 | 9035 | 12678 | 1.3363 |
| 2 | 2 | 258 | 310 | 9837 | 10000 | 14027 | 1.3372 |
| (2 | 2) | 340 | 345 | 9881 | 9881 | 13973 | 1.3375 |
| 1.5 | 3 | 310 | 310 | 9542 | 12089 | 15401 | 1.3420 |
| (1.5 | 3) | 327 | 293 | 9544 | 11833 | 15202 | 1.3415 |
| 3 | 1.5 | 310 | 741 | 12500 | 10040 | 16032 | 1.3454 |
| 2 | 3 | 330 | 320 | 9191 | 10924 | 14276 | 1.3401 |
| (2 | 3) | 345 | 345 | 9813 | 11101 | 14816 | 1.3402 |
| 3 | 2 | 370 | 900 | 12554 | 12631 | 17808 | 1.3527 |
| (3 | 3) | 600 | 600 | 12400 | 12400 | 17536 | 1.3460 |

The data derived in the above table was obtained by heating samples of 0.6 i.v. polyethylene terephthalate material to a temperature of 80 degrees C. and stretching the heated samples biaxially at a constant velocity of 0.1 inch per second. The data listed under the two columns for "Final Stress of Material During Stretch Extension" sets out the stresses achieved in the first and second directions of stretch, respectively, at the heated temperature. The data appearing in the fifth and sixth column under "Tensile Testing Yield Stress" was derived by testing the oriented samples in an Instron at a stretching rate of one inch per second, with the samples at 23 degrees C. The data listed under the column "Density" was determined by a conventional density gradient column technique.

By way of further explanation, the data within parentheses under the first and second columns indicates that those particular samples were stretched simultaneously in the two directions. For example, the entry (2 2) indicates that this particular sample was stretched simultaneously in both directions to dimensions twice the original dimensions of the sample. Additionally, the first entry under all the columns is for an unstretched sample of polyethylene terephthalate material which was heated to 80 degrees C. and then subjected to tensile testing and density determination.

The data listed under the column "Resolved Yield Stress" is the square root of the sum of the squares of the Yield Stresses of the material in the first and second directions.

The following specific observations can be made from the above Table.

First, the final stress developed in the second direction of stretch (Column 4) for both the 3×1.5 and 3×2 sequential stretching modes is far greater than the final stress developed in any of the other tested samples, indicating the development of extensive strain hardening, which has been correlated to various improved properties. This particular data, in comparison to the other data, verifies (1) that the stretching operations must preferably be carried out sequentially, (2) that the major-dimension stretch must be performed first, and (3) that the critical major extension ratio falls somewhere between 2 and 3. As pointed out previously, it has been found that the critical major-dimension stretch is at least about 2.6 to 2.75 for polyethylene terephthalate.

Next, a comparison of the data for the sequentially stretched 3×2 with the data for the simultaneously stretched 3×3 shows that the former provides better yield stress in both directions of stretch (Column 5 and 6) and an overall better density (Column 8). This same observation can be made by comparing the sequentially stretched 3×2 with both the simultaneously stretched 2×3 and the sequentially stretched 2×3. For example, the yield stress in the 3 direction for sequentially stretched 3×2 is 12,554 psi (Column 5) in comparison with a yield stress of 11,101 psi (Column 6) for simultaneously stretched 2×3 and in comparison with a yield stress of 10,924 psi (Column 6) in the 3 direction for sequentially stretched 2×3. Similar observations can also be made by comparing the data from the sequentially stretched 3×1.5 with the data from the simultaneously stretched 1.5×3 and the sequentially stretched 1.5×3.

Further, a comparison of the data for sequentially stretched 3×2 and for simultaneously stretched 3×3 shows that improved property levels are not dependent upon total areal strain. For example, the sequentially stretched 3×2 achieved a total areal strain of 6 and produced a resolved yield stress of 17,808 psi (Column 7) and a density of 1.3527 gm/cc (Column 8). By comparison, the simultaneously stretched 3×3 with a total areal strain of 9 produced a resolved yield stress of 17,536 psi (Column 7) and a density of 1,3460 gm/cc (Column 8). Similarly the sequentially stretched 3×1.5, with a total areal strain of 4.5, achieved better property characteristics than either sequentially or simultaneously stretched 2×3 at a total areal strain of 6. Thus, the properties of the material are not solely dependent upon areal strain; rather they are also dependent upon the method of stretching.

Selected data from the above table may also be expressed in terms of property characteristics in relationship to the total areal strain, as follows:

| Extension Ratio | | Total Areal Strain | Resolved Yield Stress (PSI) | Resolved Yield Stress Areal Strain (PSI) |
|---|---|---|---|---|
| 1st | 2nd | | | |
| 1.5 | 3 | 4.5 | 15401 | 3422 |
| (1.5 | 3) | 4.5 | 15202 | 3378 |
| 3 | 1.5 | 4.5 | 16032 | 3563 |
| 2 | 3 | 6 | 14276 | 2379 |
| (2 | 3) | 6 | 14816 | 2470 |
| 3 | 2 | 6 | 17808 | 2968 |
| 3 | 3 | 9 | 17536 | 1948 |

This data, along with the comparative density data, is graphed on the next page and shows that the resolved yield stress is not solely a function of areal strain.

there is no major significance in final material properties between sequentially stretched, major-dimension stretch first, simultaneously stretched, or minor-dimension stretch first where the total areal strain is more than about nine. This is because strain hardening occurs in polyethylene terephthalate for substantially all types of biaxial stretching at total areal strains over about nine, regardless of the stretching sequences. Accordingly, the primary advantages of this invention, over other methods, occur when the total areal strain of the material is less than about nine.

Turning now to a specific application for the present invention, FIGS. 4–7 illustrate a blow molding operation where a blowable plastic parison is heated to a temperature conducive to molecular orientation and then stretched and blown within a blow mold cavity.

Figure 5:
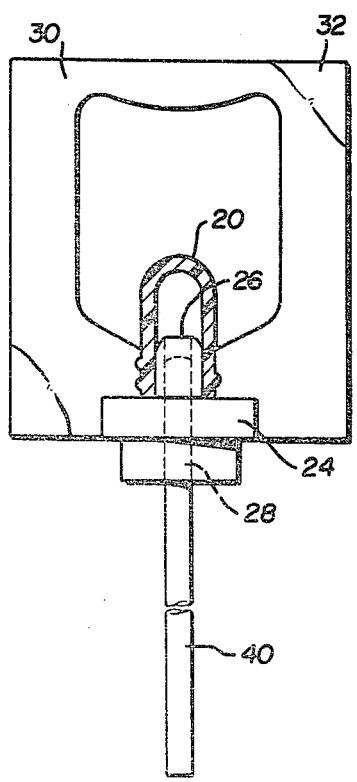
Figure 6:
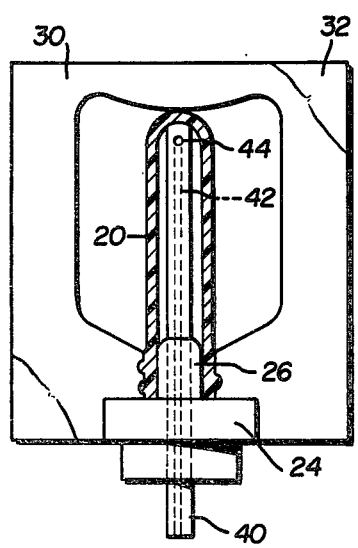
Figure 7:
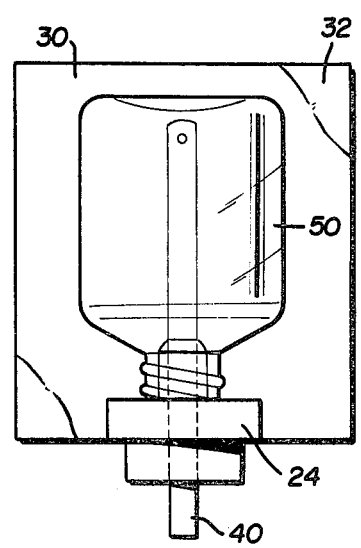

FIG. 4 illustrates a thermoplastic parison 20 supported upon a laterally movable mandrel 22 which is conveyed in heat exchange proximity to a bank of radiant heaters 23. as shown in FIGS. 5 and 6, the laterally movable mandrel includes a cylindrical base 24 which is received within a complementary-shaped recess in the

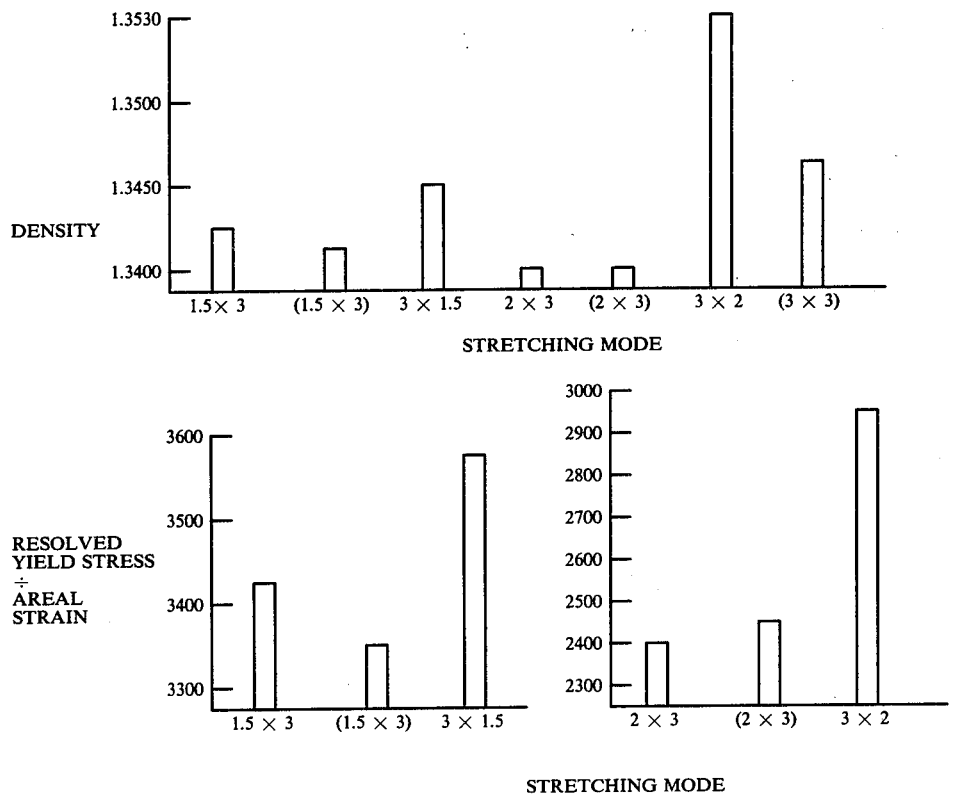

Other results show that a reduction in the temperature of the polyethylene terephthalate material during the biaxial stretching operation does not significantly reduce the magnitude of the major-first strain required to achieve the advantages of sequential stretching. Lower stretching temperatures, however, are generally desirable as discussed previously. Additionally, other tests have been conducted to determine whether increased stretching speeds during the biaxial stretching would significantly lower the magnitude of the major-first strain necessary for the advantages of the present invention. These results show that the critical extension is not significantly reduced for increased strain rates up to 0.625 inches per second. Other results show that closed blow mold sections. The mandrel also includes a support nose 26 upon which the parison is telescopically supported, and an opening 28 which extends through the mandrel and support nose, for a purpose to be more fully explained below.

As the mandrel and parison are laterally conveyed adjacent to the radiant heating means by conventional means, these elements are also rotated about their vertical axes so that the parison will be heated to a substantially uniform temperature around its periphery. It is during this operation that the temperature of the parison is raised to a level so that the material will be at a temperature conductive to molecular orientation during the subsequent stretching and blow molding operations.

After the parison is sufficiently heated, the mandrel and parison are placed between two opened sections 30 and 32 of a blow mold, which are then closed upon the mandrel and parison, as shown in FIG. 5. Immediately thereafter, a stretch and blow rod 40 is inserted through opening 28 in the mandrel to a position shown in FIG. 6, in order to subject the heated parison, while at a temperature conducive to molecular orientation, to the critical, major first stretching operation. As discussed previously, in connection with FIGS. 1–3, the first stretching step must preferably elongate the parison to a length which, for polyethylene terephthalate, is at least about 2.6 to 2.75 times the original length of the parison, in order to achieve the advantages afforded by the present invention. Again, this stretching operation aligns the molecules of the material predominantly along the axis of the parison and conditions the material for the onset of rapid and extensive strain-hardening during the blow molding step.

After the stretching is completed, blow air under pressure is then introduced into the interior of the stretched parison through the blow rod 40 by way of an axial opening 42 and interconnecting radial ports 44. This blow molding operation serves to expand the stretched parison to the shape of the final container 50 and to stretch the thermoplastic material in a second direction, in order to produce extensive strain hardening. It has been found that the blow air should preferably be at a pressure of from between about 400 and 600 psi, due to the temperature of the material and to the resistance of the material to stretching.

Thereafter, the stretch and blow rod 40 is retracted, and the blow mold sections 30 and 32 are opened to expose the blown bottle 50 for ejection from the blow mandrel 22, which is then used in subsequent heating and blowing operations.

Again, the advantages of this invention over other methods are achieved primarily for total expansion ratios of less than about nine. As explained previously, substantially all biaxial stretching operations for total expansion of over about nine yield approximately the same improved property characteristics. For total stretch and blow expansions greater than about nine, improved properties are achieved but these properties are essentially the same as those achieved, for example, by either a simultaneous stretch and blow or a minor-dimension-first stretching operation.

It will be understood that the foregoing disclosure is exemplary rather than limiting. For example, the disclosure has been directed primarily to polyethylene terephthalate materials; however, the invention is equally applicable to any thermoplastic materials that are conductive to strain hardening, such as by induced crystallization or by intermolecular bonding. For these other materials, the critical stretch length in the first direction may vary from that for polyethylene terephthalate but must be sufficient so that intense strain hardening will occur substantially immediately upon the initiation of the second subsequent stretching step. In connection with the blow molding aspect of this invention, the parison may be stretched outside of the blow mold as well as within the blow mold cavity. Further, the invention may be used in blow and blow operations as well as in the single blow operation disclosed.

Having therefore completely and fully disclosed our invention, we now claim:

1. In a method of blow molding a container, wherein a blowable preform of approximately 0.9 inherent viscosity polyethylene trephthalate material is expanded by a total expansion ratio of less than about nine, the step of:

heating a blowable preform of polyethylene terephthalate to a temperature in the range of from about 75° C. to about 110° C.;

enclosing the preform in a mold cavity;

while the preform is at a temperature conducive to molecular orientation, stretching the preform along its longitudinal axis to a length which is at least 2.6 times the original preform dimension along the longitudinal axis, the extent of stretch conditioning the material for the rapid onset of strain hardening during the subsequent blowing operation, and with the minimum extent of stretching being dependent upon the inherent viscosity of the material such that preforms of polyethylene terephthalate material having an inherent viscosity of less than 0.9 require slightly greater stretches;

introducing blow air under pressure into the interior of the stretched preform while the stretched preform is still at a temperature conducive to molecular orientation, to expand the preform to the size and configuration of the final container, the extent of expansion during the blow step being not greater than the extent of expansion during the stretching step, with the total amount of expansion of the preform during the stretching and blowing steps: (a) being less than that where other modes of expansion achieve equivalent improved property characteristics, (b) being less than about nine, and (c) achieving improved properties in the material over other modes of blow molding at the same total areal strain, and with strain hardening being initiated substantially immediately after the beginning of the blowing step due to the extent of expansion during the stretching step; and then removing the strain-crystallized article from the mold.

2. In a method of reducing the total areal strain required to induce strain hardening in a blown polyethylene terephthalate article in order to increase the yield stress and density of the material, the steps of:

heating a blowable parison of polyethylene terephthalate material to a temperature in the range of about 75° C. to about 110° C., or slightly higher, so that the material will be at a temperature conducive to molecular orientation during the subsequent steps:

stretching the parison along its axis to a length which is at least about 2.6 to 2.75 times the original axial length: (a) to axially orient the molecules of the material in said first direction, (b) to condition the material for the rapid onset of strain hardening during a subsequent stretching mode, and (c) to initiate strain-induced crystallization, the extent of stretching required being dependent upon the inherent viscosity and molecular weight of the material, with materials having an inherent viscosity of about 0.6 and a weight average molecular weight of about 36,000 requiring a minimum stretch in the first direction of about 2.75 and with materials having an inherent viscosity of about 0.9 and a weight average molecular weight of about 65,500 requiring a minimun stretch in the first direction of about 2.6; and subsequently stretching the parison in the hoop direction within a mold cavity to strain harden the material, with the total strain of the material as a result of the two stretching steps being less than about nine;

the performance of both stretching steps being conducted while the polyethylene terephthalate material is at a temperature within a range conducive to molecular orientation, with the temperature being dependent upon the inherent viscosity of the material, and being no greater than about 110° C. and no less than about the following specified temperatures, when stretched at a stretch rate of about 0.025 inch sec−1:

| Inherent Viscosity | Temperatures |
|---|---|
| .9 | 83.0° C. |
| .8 | 81.0° C. |
| .7 | 78.5° C. |
| .6 | 75.0° C. |
| .5 | 75.0° C. |

3. The method as defined in claim 2 characterized by the first stretching step being performed within the blow mold cavity.

4. In a method of blow molding an article comprised of polyethylene terephthalate, the steps of:

(1) enclosing an essentially tubular, blowable polyethylene terephthalate preform in a blow mold at a temperature in the range for substantial molecular orientation;

(2) conditioning the preform while in said temperature range by stretching along its longitudinal axis to a length at least about 2.6 times that of the original preform longitudinal dimension, to initiate strain-induced crystallization, to establish longitudinal molecular orientation, and to condition the material for the rapid onset of extensive strain hardening in a subsequent blowing operation, the polyethylene terephthalate being sensitive to inherent viscosity such that materials having an inherent viscosity of less than about 0.9 require a greater minimum axial elongation to condition the material for the later extensive and substantially immediate strain hardening; thereafter, (3) radially expanding the stretched preform to the configuration of the mold cavity while the preform material is still in said temperature range, by introducing blow fluid under pressure into the interior of the preform and initiating extensive strain hardening substantially immediately upon the initiation of the radial expansion due to the extent of longitudinal stretching in Step 2, the total areal strain of the preform during Steps 2 and 3 being less than that where other modes of expansion achieve substantially equivalent property improvements and less than about 9; and (4) removing the strain crystallized and extensively strain-hardened article from the mold.

5. In a method of blow molding an article of polyethylene terephthalate material, the steps of:

heating an essentially tubular parison of polyethylene terephthalate material to a temperature conducive to molecular orientation, the temperature being in the range from about 75° C. to about 110° C., and the precise temperature being dependent upon the stretch rate and the molecular weight of the polyethylene terephthalate material in the parison, with higher molecular weights requiring a higher temperature within the range;

axially stretching the parison while at a temperature conducive to molecular orientation to elongate the parison to a length of at least about 2.6 to 2.75 times its original length, to initiate strain-induced crystallization and to condition the parison for the onset of strain hardening upon the initiation of the blowing step, the minimum extent of elongation being dependent upon the molecular weight of material, with higher molecular weights requiring lesser elongations; thereafter, blowing the parison, while at a temperature conducive to molecular orientation, to the shape of the final article to obtain a bottle having a density and yield stress greater than that of the original parison due to substantially immediate and extensive strain hardening and strain-induced crystallization, the extent of areal strain of the parison during the blowing step being approximately equal to or less than the areal strain during the axial stretching step, and the total area strain during both the stretching and blowing steps being less than about nine; and removing the strain-crystallized blown article from the mold as a finished product.

6. In a method of reducing the total areal strain required to induce strain hardening in a blown polyethylene terephthalate article in order to increase the yield stress and density of the material, the steps of:

heating a blowable parison of polyethylene terephthalate material to a temperature in the range of about 75° C. to about 110° C., will be at a temperature conducive to molecular orientation during the subsequent steps;

stretching the parison along its axis: (a) to axially orient the molecules of the material in said first direction, (b) to condition the material for the rapid onset of strain hardening during a subsequent stretching mode, and (c) to induce strain-induced crystallization, the extent of stretching required being dependent upon the inherent viscosity and molecular weight of the material, with materials having an inherent viscosity of about 0.9 and a weight average molecular weight of about 65,500 requiring a minimum stretch in the first direction of about 2.6, materials of lesser inherent viscosity and lesser molecular weight requiring greater stretching;

subsequently stretching the parison in the hoop direction within a mold cavity to strain harden the material, the extent of stretch in the hoop direction being equal to or less than the extent of axial stretch, and the total areal strain of the material being less than about nine for material having an inherent viscosity of 0.9 and a molecular weight of about 65,500;

the performance of both stretching steps being conducted while the polyethylene terephthalate material is at a temperature within the range conducive to molecular orientation, with the temperature being dependent upon the inherent viscosity of the material, and being no greater than about 110° C. and no less than about the following specified temperatures, when stretched at a stretch rate of about 0.025 inch sec−1:

| Inherent Viscosity | Temperature |
| --- | --- |
| .9 | 83.0° C. |
| .8 | 81.0° C. |
| .7 | 78.5° C. |
| .6 | 75.0° C. |
| .5 | 75.0° C. |

7. In a method of blow molding an article of polyethylene terephthalate material, the steps of:
heating an essentially tubular parison of polyethylene terephthalate material to a temperature conducive to molecular orientation, the temperature being in the range from about 75° C. to about 110° C. and preferably about 83° C. or higher for material having an inherent viscosity of 0.9, the precise temperature being dependent upon the stretch rate and for the other materials of different molecular weights upon the inherent viscosity of such other materials, with lower inherent viscosity materials preferentially requiring low temperatures within the range;
axially stretching the parison while at a temperature conducive to molecular orientation to elongate the parison to a length of at least about 2.6 times its original length for material having an inherent viscosity of about 0.9, to initiate strain-induced crystallization and to condition the parison for the onset of strain hardening upon the initiation of the blowing step, the minimum extent of elongation being dependent upon the molecular weight of the material, with lower inherent viscosity materials requiring higher elongations; thereafter,
blowing the parison, while at a temperature conducive to molecular orientation, to the shape of the final article to strain harden the material and to obtain a bottle having a density and yield stress greater than that of the original parison, the extent of areal strain of the parison during the blowing step being approximately less than or equal to the areal strain during the axial stretching step, and the total areal strain during both the stretching and blowing steps being less than about nine for material having an inherent viscosity of 0.9 in order to achieve improved properties in the material over other modes of operation for the same total areal strain; and
removing the strain-crystallized blown article from the mold as a finished product.

8. In a method of blow molding an article of polyethylene terephthalate material, the steps of:
heating an essentially tubular parison of polyethylene terephthalate material to a temperature conductive to molecular orientation, the precise temperature being dependent upon the stretch rate, and for other materials of different molecular weights upon the inherent viscosity of such other materials, with lower inherent viscosity materials preferentially requiring lower temperatures within the range;
axially stretching the parison while at a temperature conducive to molecular orientation to elongate the parison to initiate strain-induced crystallization and to condition the parison for the onset of strain hardening upon the initiation of the blowing step, the minimum extent of elongation being dependent upon the inherent viscosity and molecular weight of the material, with lower inherent viscosity materials requiring higher elongations, with materials having an inherent viscosity of about 0.6 and a weight of about 36,000 requiring a minimum stretch in the first direction of about 2.75 and with materials having an inherent viscosity of about 0.9 and a weight average molecular weight of about 65,000 requiring a minimum stretch in the first direction of about 2.6; thereafter, blowing the parison, while at a temperature conducive to molecular orientation, to the shape of the final article to strain harden the material and to obtain a bottle having a density and yield stress greater than that of the original parison, the total areal strain during both the stretching and blowing steps being less than about nine for a material having an inherent viscosity of 0.9 in order to achieve improved properties in the material over other modes of operation for the same total areal strain; and
removing the strain-crystallized blown article from the mold as a finished product.

9. In a method of blow molding an article of polyethylene terephthalate material, the steps of:
enclosing an essentially tubular parison of polyethylene terephthalate material in a mold, said parison being at a temperature conducive to molecular orientation, the temperature being in a range from about 75° C. to about 110° C. and preferably about 83° C. or higher for material having an inherent viscosity of 0.9, the precise temperature being dependent upon the stretch rate, and for other materials of different molecular weights upon the inherent viscosity of such other materials, with lower inherent viscosity materials preferentially requiring lower temperatures within the range;
axially stretching the parison while at a temperature conducive to molecular orientation to elongate the parison to a length of at least about 2.6 times its original length for material having an inherent viscosity of about 0.9, to initiate strain-induced crystallization and to condition the parison for the onset of strain hardening upon the initiation of the blowing step, the minimum extent of elongation being dependent upon the molecular weight of the material, with lower inherent viscosity materials requiring high elongations; thereafter,
blowing the parison, while at a temperature conducive to molecular orientation, to the shape of the final article to strain harden the material and to obtain a bottle having a density and yield stress greater than that of the original parison, and the total areal strain during both the stretching and blowing steps being less than about nine for material having an inherent viscosity of about 0.9 in order to achieve improved properties in the material over other modes of operation, and
removing the strain-crystallized blown article from the mold as a finished product.

* * * * *